United States Patent
Santos et al.

(10) Patent No.: US 6,763,986 B2
(45) Date of Patent: Jul. 20, 2004

(54) CONVERTIBLE TRAVEL TOTE BAG FOR USE IN A VEHICLE

(76) Inventors: Maryann C. Santos, 5652 Revelwood Loop, Winter Park, FL (US) 32792; Richard Santos, 5652 Revelwood Loop, Winter Park, FL (US) 32792; Andrew J. Paluda, 32741 Friar Tuck La., Beverly Hills, MI (US) 48025

(*) Notice: Subject to any disclaimer, the term of this patent is extended or adjusted under 35 U.S.C. 154(b) by 0 days.

(21) Appl. No.: 10/171,201

(22) Filed: Jun. 13, 2002

(65) Prior Publication Data

US 2003/0230612 A1 Dec. 18, 2003

(51) Int. Cl.⁷ .............................................. A45C 15/00
(52) U.S. Cl. ..................... 224/585; 224/586; 224/275; 383/39
(58) Field of Search ................................. 224/584, 585, 224/586, 275, 277, 576, 575; 206/581, 806; 150/118; 190/903; 383/39

(56) References Cited

U.S. PATENT DOCUMENTS

| | | | |
|---|---|---|---|
| 2,767,895 A | * 10/1956 | Smith | .......................... 224/275 |
| 4,154,323 A | 5/1979 | Sneider | |
| 4,466,659 A | * 8/1984 | Carpentier et al. | .... 297/188.06 |
| 4,566,130 A | 1/1986 | Coates | |
| 4,655,343 A | 4/1987 | Lane et al. | |
| 4,685,570 A | 8/1987 | Medow | |
| 4,723,300 A | 2/1988 | Aranow | |
| 4,886,150 A | 12/1989 | Fitzsimmons | |
| 4,940,068 A | 7/1990 | Pokorny et al. | |
| 4,960,204 A | * 10/1990 | Young et al. | ................ 206/235 |
| 4,984,906 A | 1/1991 | Little | |
| 5,439,154 A | 8/1995 | Delligatti | |
| 5,692,257 A | 12/1997 | Albertieri | |
| 5,743,649 A | 4/1998 | Gonzalez | |
| 5,855,412 A | 1/1999 | Smith et al. | |
| 5,878,672 A | * 3/1999 | Ostermann et al. | ........... 108/44 |
| 5,961,216 A | 10/1999 | Quinn et al. | |
| 6,053,634 A | 4/2000 | Kay | |
| 6,182,931 B1 | * 2/2001 | Richard | ...................... 248/102 |
| 6,213,304 B1 | 4/2001 | Juliussen | |
| 6,244,484 B1 | 6/2001 | Farrell | |
| 6,298,509 B1 | 10/2001 | Vickers | |
| 6,298,993 B1 | 10/2001 | Kalozdi | |
| 6,327,726 B1 | 12/2001 | Weber | |
| 6,510,974 B2 | * 1/2003 | Willingham et al. | ......... 224/657 |
| 2003/0085246 A1 | * 5/2003 | Reisman et al. | ............ 224/275 |

OTHER PUBLICATIONS

"A Place for Everything, Anywhere" and "While Away The Miles", Leaps and Bounds Catalog, pp. 32 and 33. No Date.

* cited by examiner

*Primary Examiner*—Stephen K. Cronin
(74) *Attorney, Agent, or Firm*—Gifford, Krass, Groh, Sprinkle, Anderson & Citkowski, P.C.

(57) ABSTRACT

A convertible travel tote bag and car seat organizer for use with a vehicle seat. The organizer includes an elongated and substantially planar body constructed of a flexible material and having a first half and a second foldable half. A plurality of enclosure defining pockets are incorporated into at least one facing side of the body of flexible material and one or more straps extend from the body at first and second locations. The first and second halves defining the body are connected together in a first folded and portable configuration. The first and second halves are further unfolded and the strap engaged about a location of the vehicle seat, such as about an associated head rest, to support the planar body and to provide access to the enclosure defining pockets in a second vehicle travel configuration.

21 Claims, 5 Drawing Sheets

US 6,763,986 B2

CONVERTIBLE TRAVEL TOTE BAG FOR USE IN A VEHICLE

BACKGROUND OF THE INVENTION

1. Field of the Invention

The present invention relates generally to travel bags and the like, in particular those suitable for use with infants and toddlers. More particularly, the present invention teaches a combination diaper bag/convertible travel tote bag which may be converted between a folded and hand carrying condition and an unfolded/unzippered condition in which the bag is secured in exposed and arrayed fashion upon a seat front or seat back. The tote bag/seat organizer of the present invention further reveals a number of individual item carrying compartments particularly suited for holding both personal and infant/toddler related items.

2. Description of the Prior Art

The prior art is well documented with examples of convertible diapering and tote bags. These types of bags are particularly well suited for use with infants and toddlers and permit the parent or supervising adult to maintain the variety of individual items usually attendant with caring for children.

A first example of the relevant art is illustrated in U.S. Pat. No. 6,327,726, issued to Weber, and which teaches a baby diaper-changing pad suitable for use in a passenger motor vehicle having two spaced apart seats. Weber provides a roll up mat of an elastic material which has, at two opposite ends, straps and/or loops by which the mat can be affixed to two head supports of two seats of the vehicle disposed one behind the other in the direction of travel. A soft baby pad is provided on the inner side between the ends with the straps and/or loops. The arrangement of the baby pad on the mat and the dimensions of the mat and of its straps and/or loops are chosen such that, when the mat is affixed to the head supports, it rests in that area with its exterior on a seat surface of the rear seat in the direction of travel in which the baby pad is disposed on the inner side of the mat.

U.S. Pat. No. 5,743,649, issued to Gonzalez, teaches a diaper bag which contains a number of separate compartments for maximum organization and accessibility. A flat rectangular piece of material is provided and to which other materials, both opaque fabric and see through mesh fabric, are sewn as compartments in a configuration designed to arrange the infant care accessories in an orderly fashion. On the opposite side of the main piece of material is yet another compartment sewn on as a pocket, the pocket being lined with plastic and having three elastic bottle holders within. At either end of the bag straps are sewn on for ease of portability and, upon folding the bag in half with the several pockets on the inside of the fold, the two ends of the bag are secured by fasteners in a strap carrying and converted position.

U.S. Pat. No. 4,723,300, issued to Rosalind, teaches a further variation of a convertible tote bag for holding articles and which includes front and rear panels connected together along their side edges by a pair of zippers. When the zippers are unzipped, the panels can be folded flat, thereby exposing a moisture absorbing pad on which a baby can be placed during diapering. The moisture absorbent pad is releasably secured to the panels and interposed between the pad and panels is a releasably secured and moisture impervious barrier layer to protect the panels from being wet or soiled. The barrier layer and the pad can be readily removed to enable each to be cleaned and the bag also includes a pair of carrying handles and at least one exterior pocket.

Yet additional examples of convertible bag carrying devices are illustrated in U.S. Pat. Nos. 6,053,634, issued to Kay, and 4,886,150, issued to Fitzsimmons. In each case, a convertible bag is illustrated for holding articles. In the instance of Kay, a bag is arranged to be opened into a reclining mat to provide a sanitary surface for reclining a child thereon. In the instance of Fitzsimmons, a releasable and impermeable pad is secured in transverse extending fashion across a generally central area of the changing device, similar to Weber.

SUMMARY OF THE PRESENT INVENTION

The present invention discloses a combination diaper bag/convertible travel tote bag which is an improvement over prior art diaper/tote bags in that it may be converted between a folded and hand carrying condition to an unfolded/unzippered condition in which the bag is secured in exposed and arrayed fashion upon a seat front or seat back, this not being possible with any of the prior art bag devices. Furthermore, the tote bag/seat organizer of the present invention reveals a number of individual item carrying compartments, particularly suited for holding both personal and infant/toddler related items, and which is within easy access of a supervising adult within a vehicle.

The organizer includes an elongated and substantially planar body constructed of a flexible material, such as a commercial grade cloth, vinyl or leather fabric and having a first half and a second foldable half. A plurality of enclosure defining pockets are incorporated into at least one facing side of the body of flexible material, and the body may also include pockets defined on both sides.

One or more straps extend from the body at first and second locations, such as at opposite midpoint edge locations of the body, as well as possibly additional edge locations associated with first and second ends of the body. In varying applications, the straps are either fixed or adjustable and may be secured to the flexible body by Velcro attachments, hook and loop fasteners, or male and female snap engagement portions.

The first and second halves defining the body are connected together in a first folded and portable configuration, and such as through the use of interengaging zippered portions. The first and second halves are further unfolded and one or more of the straps engaged about a location of the vehicle seat, such as about an associated head rest, and in order to support the planar body in its arrayed position and to provide access, for either a vehicle operator or occupant, to the enclosure defining pockets.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1A:
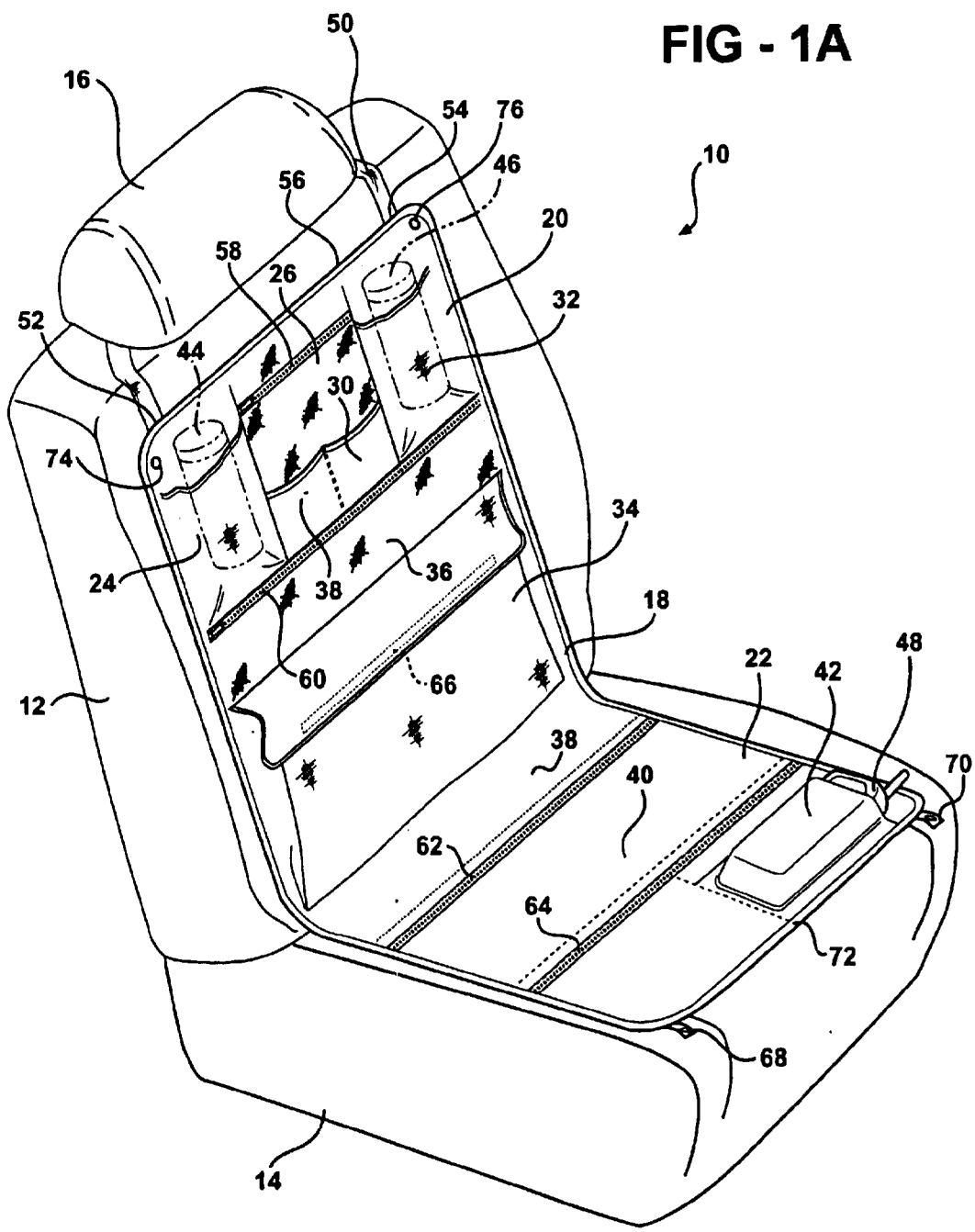
FIG. 1A is a perspective view of the combination travel tote bag and car seat organizer according to a first preferred application of the present invention and in which the bag is arrayed in an unfolded condition laying upon a seat front and seat bottom.

Referring now to FIG. 1A, a combination convertible travel tote bag and car seat organizer is illustrated at 10 according to a first preferred application of the present invention and in which the convertible organizer is arrayed in an unfolded condition laying upon a front facing side of a seat back 12 and seat bottom 14 forming, along with an upwardly extending head rest 16, components of a standard vehicle interior seat. As previously described, the present invention is an improvement over prior art diaper/tote bags in that it may be converted between a folded and hand carrying condition to an unfolded/unzippered condition in which the bag is secured in exposed and arrayed fashion upon a seat front or seat back, this not being possible with any of the prior art bag devices.

The bag includes an elongated and substantially planar shaped body 18 including a first half 20 and a second foldable half 22. The body 18 is preferably constructed of a durable commercial grade fabric such as including a fabric, cloth, vinyl or leather material. A plurality of enclosure defining pockets are illustrated at 24, 26, 28, 30, 32, 34, 36, 38, 40 and 42 along a selected facing side of both the first 20 and second 22 foldable halves. The pockets are configured to handle a number of conventional items, in particular those associated with infant and toddler care, and include such as cups or cans of formula or juice (see at 44 and 46 in associating fashion with pockets 24 and 32) and also illustrate a cellular phone 48 in associating fashion with pocket 42. Although not shown, it is understood that other and additional baby and infant care items are easily accommodated within the various pocket receiving apertures defined within the foldable halves of the elongated and flexible body 18.

A strap is illustrated at 50 and includes first 52 and second 54 ends connected to opposite ends of an upper extending edge 56 of the planar shaped body 18 and such that the strap 50 extends about the head rest 16 of the seat. In this manner, the first (upper) foldable half 20 is supported in overlaying fashion upon a front facing side of the upper seat back 12, whereas the second (lower) foldable half 22 is supported upon the seat bottom 14. A number of zippers are illustrated at 58, 60, 62 and 64 and correspond to providing access to pockets 26, 36, 38, and 40, respectively. It is also understood that other and additional types of fastening or reclosing structure can be employed in use with the pockets and such may include button hole fasteners, Velcro attachment fasteners (see also at 66 for covering flap associated with pocket 34) and the like.

The embodiment 10 of the convertible organizer is particularly suited for use by an attending parent or guardian who is operating a motor vehicle and in order to easily access a number of individual items typically associated with such as a diaper bag and in order to attend to the needs of an infant or toddler situated in a rear seat of the vehicle. As further illustrated in FIG. 1A, button fasteners 68 and 70 are shown extending from an opposite and lower extending edge 72 and, upon folding the halves 20 and 22 together, engage associated snap fasteners 74 and 76 arranged proximate the upper extending edge 56 of the body 18. In this fashion, the strap 50 is disengaged from about the vehicle headrest 16 and the bag converted to a portable and carrying condition.

Figure 1B:
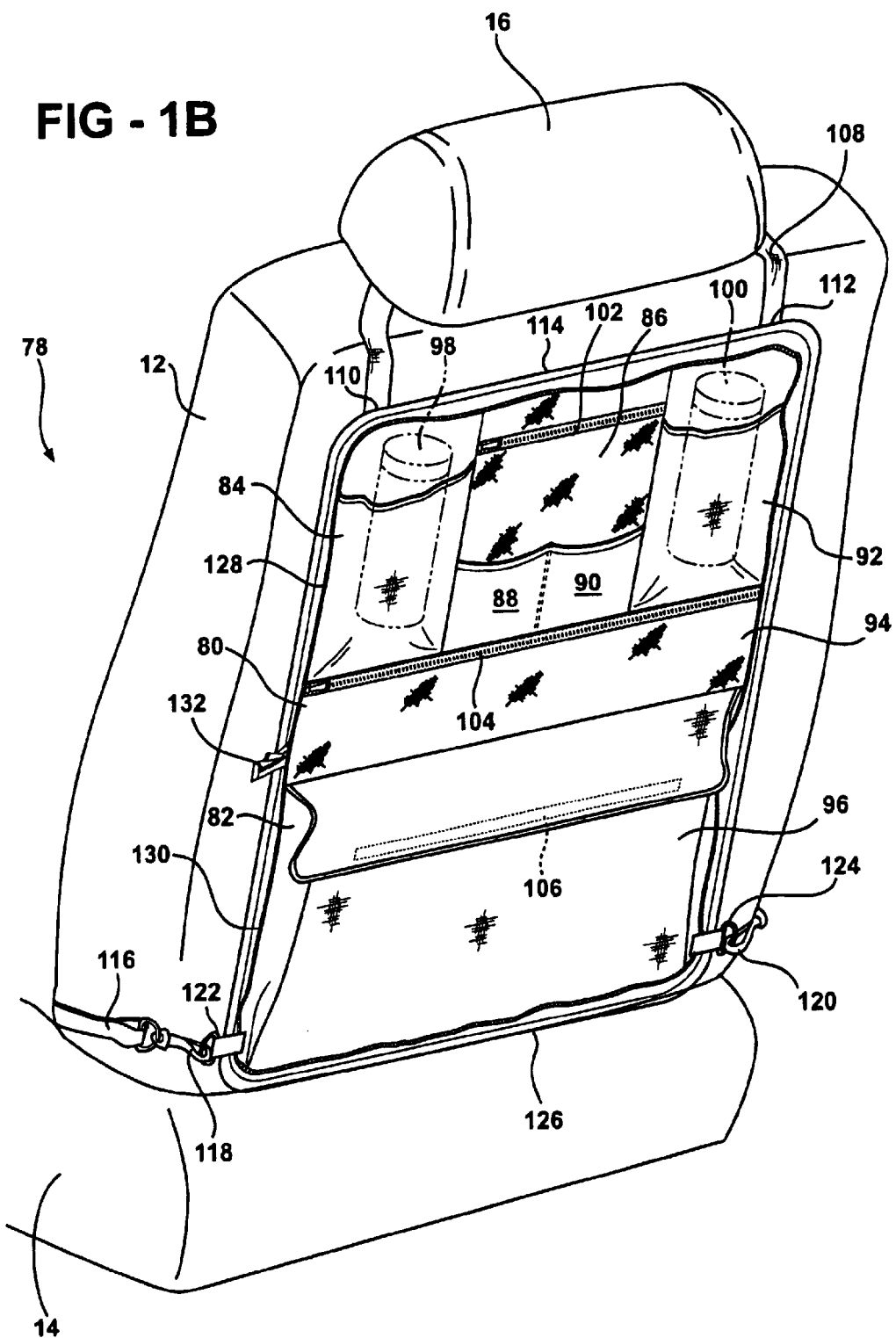
FIG. 1B is a perspective view of the combination travel tote bag and car seat organizer according to a second preferred application of the present invention and in which a modified size variant of the bag is arrayed in a further unfolded condition extending from a seat back of the vehicle interior.
Figure 2:
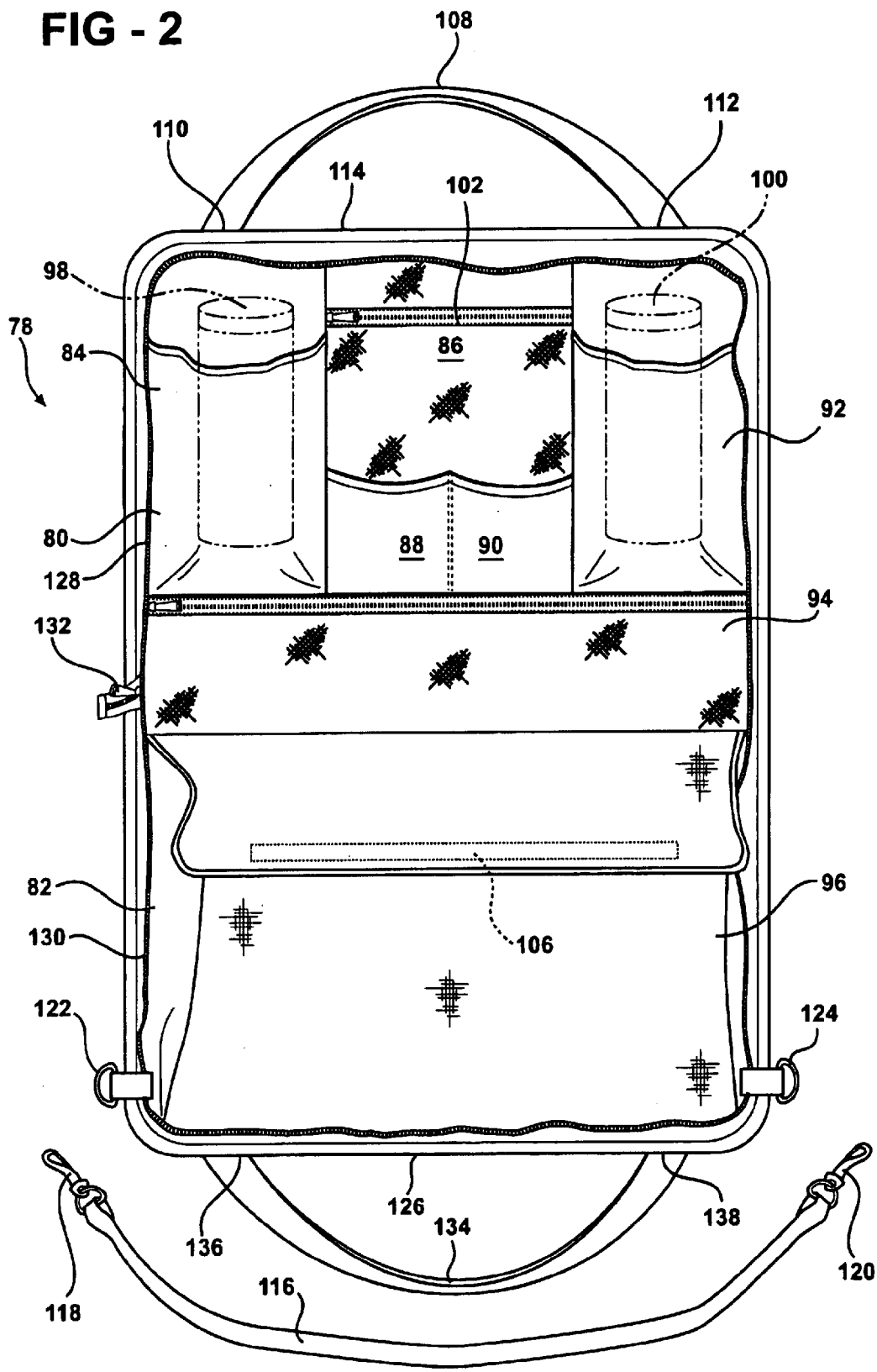
FIG. 2 is an unfolded plan view illustration of the travel tote bag as particularly illustrated in FIG. 1B and further showing in partially exploded fashion the hook and loop fasteners for securing the lower strap around a periphery of a lower seat back or seat bottom upon which the bag is secured.

Referring now to FIGS. 1B and 2, a perspective illustration is shown at 78 of a combination travel tote bag and car seat organizer according to a second preferred application of the present invention. The variant 78 is similar in comparison to the organizer 10 illustrated in FIG. 1A, with the exception that it is modified (reduced) in size so as to be arrayed in a further unfolded condition extending from a rear facing side of the seat back 12 of the vehicle interior located car seat.

In particular, the variant 78 illustrates a design of a convertible tote/diaper bag which is substantially half the size of that illustrated in FIG. 1A and in which a first foldable half 80 includes an array of pockets 84, 86, 88, 90, 92 and 94, whereas a second foldable half 82 includes a single large pocket 96. Items such as at 98 and 100 are again included in association with pockets (see at 84 and 92, respectively), and reclosable fasteners such as exemplified by zippers 102 and 104 may be provided with associated pockets 86 and 94. Similar to that also shown in FIG. 1A, Velcro fasteners 106 are provided for resecuring in closing fashion the enlarged pocket 96 associated with the lower folding half 82 of the convertible bag.

Similar to the variant of FIG. 1A, a strap 108 includes opposite ends 110 and 112 secured to a first extending edge 114 of the elongated and flexible body and such that the strap 108 extends about the headrest 16 of the seat. A secondary strap 116 is provided and includes opposite hook fasteners 118 and 120 which engage associated loop fasteners 122 and 124, respectively, extending from proximate a second extending edge 126 of the convertible organizer.

The second strap 116 secures about a base of the seat back 12, in proximity to the seat bottom 14, and so that the variant 78 may be secured in extending fashion to the rear facing side of the seat for use by an attending parent or guardian situated in a rearwardly positioned seat of the vehicle and in which it is desirous to access the various pocket enclosures. A pair of peripheral extending and continuous zipper portions, see at 128 and 130, are illustrated in extending fashion about the associated halves 80 and 82 and, upon actuating portion 132, interengages the halves together in a folded and portable condition.

Referring again to FIG. 2, an unfolded plan view illustration of the travel tote bag 78 is again illustrated and further shows in partially exploded fashion the second strap 116 with the hook 118 and 120 and loop 122 and 124 fasteners for securing the lower strap around a periphery of a lower seat back or seat bottom upon which the bag is secured. Also illustrated in FIG. 2 is a further fixed strap 134 (similar to that illustrated at 108) securing at ends 136 and 138 associated with the lower opposite edge 126 of the convertible bag and to facilitate carrying in its zippered and portable configuration. As is further known, the strap 116 is capable of being hooked to associated loops or eyelets (not shown in FIG. 2 but evident in FIG. 4) associated with midpoint edge locations of a reverse side of the flexible and planar shaped body and to further facilitate carrying of the organizer in its converted and portable configuration.

Figure 3:
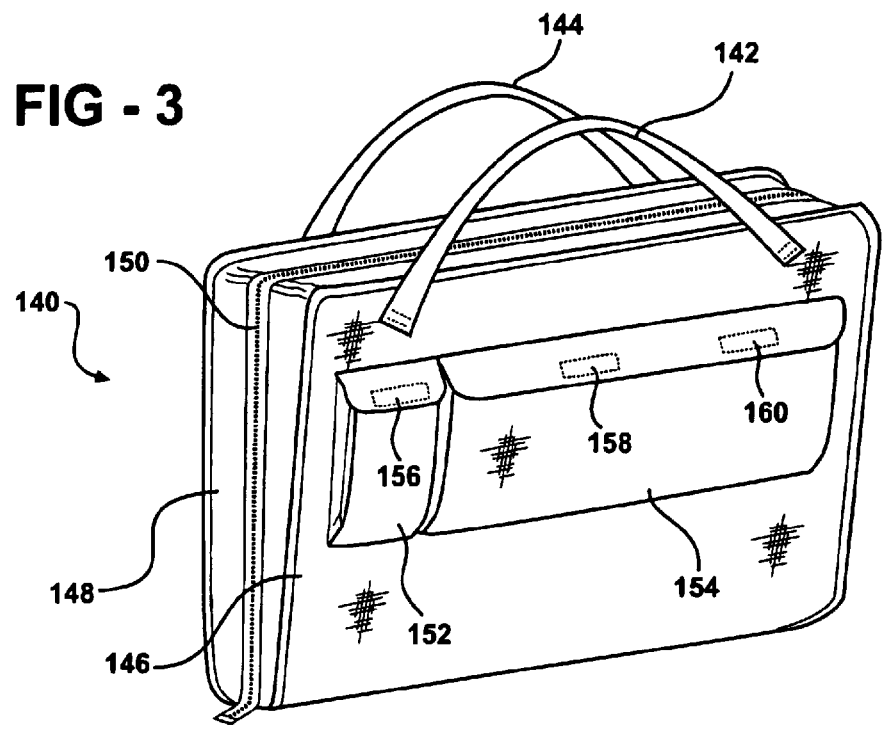
FIG. 3 is a folded/zippered configuration of the bag illustrated in either of FIGS. 1A or 1B.
Figure 4:
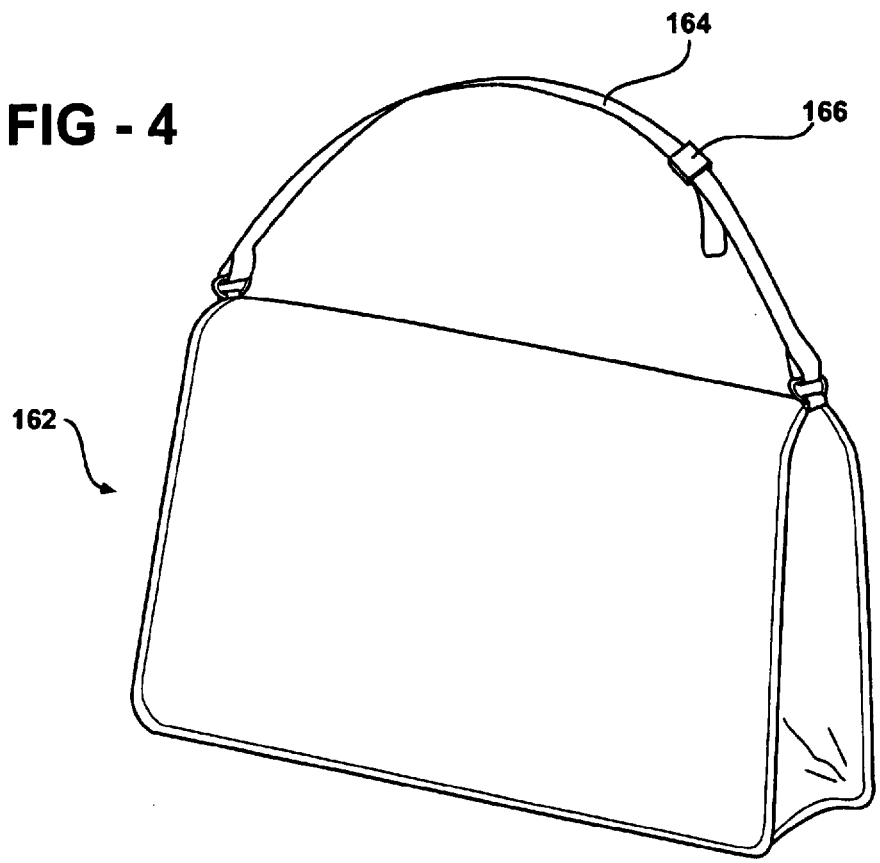
FIG. 4 is an alternate variant of a folded/zippered configuration of the convertible bag and in which the bag is strap supported in an inverted position as opposed to the arrangement illustrated in FIG. 3.

Referring now to FIG. 3, a folded/zippered configuration 140 is illustrated of a convertible bag, such as illustrated in either the embodiments of FIGS. 1A or 1B. In particular, the bag 140 includes first 142 and second 144 straps for supporting and carrying the folded halves 146 and 148 and which are zippered 150 to the closed position. Of additional note, the configuration 140 of the bag further illustrates the provision of additional enclosure pockets 152 and 154 on a reverse, or outer folded, face of the flexible body, the pockets 152 and 154 further being secured in place by Velcro portions at 156 and at 158 and 160, respectively. As also previously stated, FIG. 4 is an alternate variant of a folded/zippered configuration of the convertible bag 162 and in which the bag is strap supported 164 in an inverted position and as opposed to the arrangement illustrated in FIG. 3. Furthermore, the strap 164 is length adjustable (see at 166).

Figure 5:
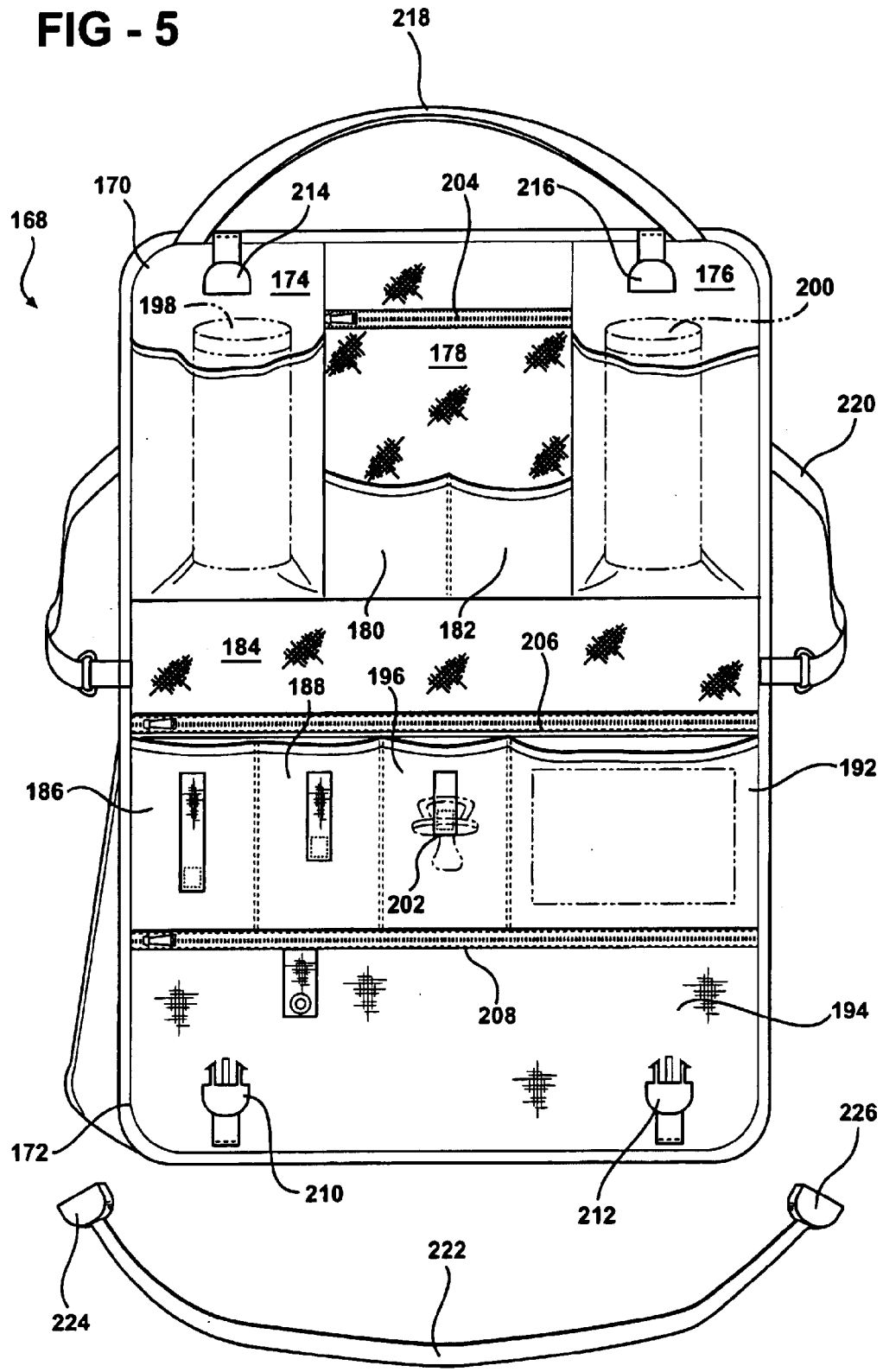
FIG. 5 is an unfolded plan view illustration of a travel tote bag, similar to that illustrated in FIG. 2, and further showing in partially exploded fashion male and female engaging connectors for securing the lower strap around a periphery of a lower seat back or seat bottom upon which the bag is secured.

Referring finally to FIG. 5, an unfolded plan view illustration of a travel tote bag, similar to that illustrated in FIG. 2, is represented generally at 168. The convertible bag 168 is largely similar to that illustrated previously and again includes a first foldable half 170 and a second foldable half 172. Pockets 174, 176, 178, 180, 182 and 184 are associated with the first foldable half 170, as are additional pockets 186, 188, 190, 192 and 194 associated with the second foldable half 172.

As described previously, a number of baby care items, see at 198, 200 and 202 are associated with selected pocket enclosures and are revealed upon opening and unfolding the bag organizer. Zippered portions 204, 206 and 208 are again shown and also of note is that the halves of the bag are folded and secured by virtue of a first pair of male engaging portions 210 and 212 extending from a lower selected edge of the flexible bag and which engage with an associated and second pair of female engaging portions 214 and 216 extending from the upper selected edge of the bag.

Once again, straps are shown at 218, associated with the bag upper edge, at 220 associated with a midpoint of a reverse facing side of the bag, and at 222 in exploded fashion. It is further understood that the third strap 222 includes additional female connectors 224 and 226 which, upon opening and arraying the bag enclosure, may engage associated male engaging portions 210 and 212 to secure such as about a base of an associated seat back (not shown).

Having described my invention, it is apparent that it teaches a novel convertible travel tote bag and car seat organizer which is quickly adapted for use upon either front or rear facing sides of a passenger vehicle. Additional preferred embodiments will become apparent to those skilled in the art to which it pertains and without deviating from the scope of the appended claims.

We claim:

1. A convertible travel tote bag and car seat organizer for use with a vehicle seat, said organizer comprising:

an elongated and substantially planar body constructed of a flexible material and including a first half and a second foldable half;

a plurality of enclosure defining pockets being incorporated into at least one facing side of said body of flexible material;

at least one strap extending from said body at first and second locations, said at least one strap including a first strap engaging at opposite ends to a first end of said elongated and planar body, a second strap likewise engaging a second end of said body;

said first and second halves being connected together in a first folded and portable configuration; and said first and second halves being unfolded and said strap engaging about a location of the vehicle seat to support said planar body and to provide access to said enclosure defining pockets in a second vehicle seat supported configuration.

2. The convertible organizer as defined in claim 1, further comprising interengaging zipper portions extending about a periphery of said elongated and substantially planar body.

3. The convertible organizer as defined in claim 1, the vehicle seat further including a sear front with an extending head rest and a seat bottom, further comprising said strap extending about the seat front in proximity to the head rest such that said body extends upon and overlays the seat front and bottom.

4. The convertible organizer as defined in claim 1, said strap engaging said body at first and second locations associated with midpoint side edges of said elongated and planar body.

5. The convertible organizer as defined in claim 1, said at least one strap further comprising hook fasteners extending from opposite ends thereof, said engaging locations of said body further comprising loop fasteners.

6. The convertible organizer as defined in claim 1, said at least one strap further comprising first male engaging portions, said engaging locations of said body further comprising second female engaging portions.

7. The convertible organizer as defined in claim 1, said at least one strap further comprising an elastic band.

8. The convertible organizer as defined in claim 1, further comprising at least one of attachment portions, snap and button portions, and zippered portions associated with each of said enclosure defining pockets.

9. The convertible organizer as defined in claim 1, said elongated and substantially planar body further comprising at least one of a fabric, cloth, vinyl and leather material.

10. The convertible organizer as defined in claim 1, said enclosure defining pockets further comprising at least one mesh screen pocket.

11. The convertible organizer as defined in claim 1, at least one of said enclosure defining pockets further comprising a covering flap.

12. The convertible organizer as defined in claim 1, further comprising said enclosure defining pockets being arranged on first and second sides of said elongated and planar body.

13. The convertible organizer as defined in claim 1, the vehicle seat further including a seat front with an extending head rest and a seat back, further comprising said strap extending about the seat front such in proximity to said head rest such that said body is arrayed in extending fashion over the sear back.

14. The convertible, organizer as defined in claim 13, further comprising a second strap extending about a base of the seat back.

15. A convertible travel tote bag and ear seat organizer for use with a vehicle seat, said organizer comprising:

an elongated and substantially planar body constructed of a flexible material and including a first half and second foldable half;

a plurality of enclosure defining pockets being incorporated into at least one facing side of said body of flexible material;

at least one strap extending from said body at first and second locations, said strap engaging said body at first and second locations associated with midpoint side edges of said elongated and planar body;

said first and second halves being connected together in a first folded and portable configuration; and said first and second halves being unfolded and said scrap engaging about a location of the vehicle seat to support said planar body and to provide access to said enclosure defining pockets in a second vehicle configuration.

16. A convertible travel tote bag and car seat organizer for use with a vehicle seat, said organizer comprising:

an elongated and substantially planar body constructed of a flexible material and including a first half and second foldable half;

a plurality of enclosure defining pockets being incorporated into at least one facing side of said body of flexible material;

a first strap engaging at opposite ends to a first end of said elongated and planar body, a second strap likewise engaging a second end of said body;

said first and second halves being connected together in a first folded and portable configuration; and said first and second halves being unfolded and said strap engaging about a location of the vehicle seat to support said planar body and to provide access to said enclosure defining pockets in a second vehicle configuration.

17. A convertible travel tote bag and car seat organizer for use with a vehicle seat, said organizer comprising:

an elongated and substantially planar body constructed of a flexible material and including a first half and second foldable half;

a plurality of enclosure defining pockets being incorporated into at least one facing side of said body of flexible material;

at least one strap extending from said body at first and second locations, said at least one strap further comprising hook fasteners extending from opposite ends thereof, said engaging locations of said body further comprising loop fasteners;

said first and second halves being connected together in a first folded and portable configuration; and said first and second halves being unfolded and said strap engaging about a location of the vehicle seat to support said planar body and to provide access to said enclosure defining pockets in a second vehicle configuration.

18. A convertible travel tote bag and car seat organizer for use with a vehicle seat, said organizer comprising:

an elongated and substantially planar body constructed of a flexible material and including a first half and second foldable half;

a plurality of enclosure defining pockets being incorporated into at least one facing side of said body of flexible material;

at least one strap extending from said body at first and second locations; said at least one strap further comprising first male engaging portions, said engaging locations of said body further comprising second female engaging portions;

said first and second halves being connected together in a first folded and portable configuration; and said first and second halves being unfolded and said strap engaging about a location of the vehicle seat to support said planar body and to provide access to said enclosure defining pockets in a second vehicle configuration.

19. A convertible travel tote bag and car seat organizer for use with a vehicle seat, said organizer comprising:

an elongated and substantially planar body constructed of a flexible material and including a firs: half and second foldable half;

a plurality of enclosure defining pockets being incorporated into at least one facing side of said body of flexible material;

at least one strap extending from said body at first and second locations, said at least one strap further comprising an elastic band;

said first and second halves being connected together in a first folded and portable configuration; and said first and second halves being unfolded and said strap engaging about a location of the vehicle seat to support said planar body and to provide access to said enclosure defining pockets in a second vehicle configuration.

20. A convertible travel tote bag and car seat organizer for use with a vehicle seat, the vehicle seat further including a seat front with an extending head rest and a seat back, said organizer comprising:

an elongated and substantially planar body constructed of a flexible material and including a first half and second foldable half;

a plurality of enclosure defining pockets being incorporated into at least one facing side of said body of flexible material;

at least one strap extending from said body at first and second locations, further comprising said strap extending about the seat front such as in proximity to said head rest such that said body is arrayed in extending fashion over the seat back, a second scrap extending about a base of the seat back;

said first and second halves being connected together in a first folded and portable configuration; and said first and second halves being unfolded and said strap engaging about a location of the vehicle seat to support said, planar body and to provide access to said enclosure defining pockets in a second vehicle configuration.

21. A convertible travel tote bag and car seat organizer for use with a vehicle seat, said organizer comprising:

an elongated and substantially planar body constructed of a flexible material and including a first half and second foldable half;

a plurality of enclosure defining pockets being incorporated into at least one facing side of said body of flexible material;

at least one of reclosable attachment portions, snap and button portions, and zippered portions associated with each of said enclosure defining pockets;

at least one strap extending from said body at first and second locations;

said first and second halves being connected together in a first folded and portable configuration; and said first and second halves being unfolded and said strap engaging about a location of the vehicle seat to support said planar body and to provide access to said enclosure defining pockets in a second vehicle travel configuration.

* * * * *